United States Patent
Li et al.

(10) Patent No.: US 9,507,091 B1
(45) Date of Patent: Nov. 29, 2016

(54) VARIABLE OPTICAL POWER SPLITTER

(71) Applicant: Alliance Fiber Optic Products, Inc., Sunnyvale, CA (US)

(72) Inventors: Yao Li, Newark, CA (US); Xiaoxu Li, Sunnyvale, CA (US); Xinzhong Wang, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 14/756,302

(22) Filed: Aug. 24, 2015

Related U.S. Application Data

(63) Continuation of application No. 13/987,809, filed on Sep. 5, 2013, now Pat. No. 9,164,242.

(60) Provisional application No. 61/795,371, filed on Oct. 16, 2012.

(51) Int. Cl.
G02B 6/34 (2006.01)
G02B 6/35 (2006.01)
G02B 6/28 (2006.01)

(52) U.S. Cl.
CPC .................................. *G02B 6/2848* (2013.01)

(58) Field of Classification Search
CPC . G02B 6/2848; G02B 6/3528; G02B 6/3524
See application file for complete search history.

(56) References Cited

U.S. PATENT DOCUMENTS

| | | | |
|---|---|---|---|
| 3,977,764 A * | 8/1976 | d'Auria | G02B 6/2817 385/25 |
| 5,740,288 A | 4/1998 | Pan | |
| 6,362,904 B1 | 3/2002 | Cormack | |
| 7,113,279 B2 | 9/2006 | Liu et al. | |
| 7,221,818 B2 * | 5/2007 | Cai | G02B 6/3524 385/15 |
| 2003/0090808 A1 * | 5/2003 | Oike | H01S 5/0687 359/640 |
| 2005/0081397 A1 * | 4/2005 | Bonham | G02B 6/32 33/645 |
| 2006/0133725 A1 * | 6/2006 | Wang | G02B 6/3524 385/22 |
| 2007/0217735 A1 | 9/2007 | Cai et al. | |

* cited by examiner

Primary Examiner — Omar R Rojas
(74) Attorney, Agent, or Firm — Dinsmore & Shohl LLP

(57) ABSTRACT

An apparatus and method for splitting and controlling optical powers provided by an input fiber and received by a plurality of output fibers comprises: (a) providing a first collimated beam from the input fiber using a first lens; (b) splitting the first collimated beam into a plurality of separated collimated beams having different directions using a collimated beam splitting device; (c) controlling area of each separated collimated beam by moving the collimated beam splitting device on a plane perpendicular to the first collimated beam; and (d) focusing the plurality of separated collimated beams using a second lens and coupling the focused beams into the plurality of output fibers, respectively.

3 Claims, 9 Drawing Sheets

VARIABLE OPTICAL POWER SPLITTER

CROSS-REFERENCE TO RELATED APPLICATIONS

This application is a continuation application of patent application Ser. No. 13/987,809, filed Sep. 5, 2013, which claims the benefit to U.S. Provisional Application No. 61/795,371, filed Oct. 16, 2012.

FIELD OF THE INVENTION

This invention relates to variable optical power splitters and more specifically to variable optical power splitters using a collimated beam splitting device that may be moved manually or electrically.

BACKGROUND OF THE INVENTION

Optical power splitter is a component widely-used in optical communication networks to provide a variety of applications such as optical signal routing and optical power allocation. With advance of agile optical networks, a variable optical power splitter (VOPS) becomes imperative to improve network scalability and flexibility. The VOPS can be regarded as the combination of an optical switch and a variable optical attenuator, and thus possesses the functions of both components. In long-haul and metropolitan networks, the VOPS can be employed as an optical switch to provide optical line protection of the networks or an optical coupler to provide optical signal performance monitoring. While in access networks such as passive optical networks, the VOPS can be deployed between optical line terminal and optical network units (ONUs) to distribute optical powers to each ONU dynamically by changing the power splitting ratio. Similarly, the VOPS can also be incorporated into an ONU to allocate optical powers among its connected end users according to their actual distance from the ONU.

A few schemes have been proposed to develop the VOPS, based on either waveguide or crystal technologies. The waveguide technologies employ a directional coupler as the key component. The variable power splitting ratio between the output ports of the coupler is achieved by changing the coupling length or separation of waveguides. However, the coupling length is dependent on the signal wavelength and therefore it is not suitable for broadband application. On the other hand, the separation of the waveguides requires precise mechanics and thus makes the VOPS rather costly.

The crystal-based VOPS can be based on solid-state crystal or liquid crystal. The solid-state crystal-based VOPS makes use of the electro-optic and/or acousto-optic effects of the crystals to achieve light modulation and power splitting. Similar to the aforementioned directional coupler, the resonance conditions in crystals rely on the signal wavelength therefore the VOPS can only be operated in a narrow wavelength range.

U.S. Pat. No. 5,740,288 discloses a variable polarization beam splitter made of a liquid crystal cell and a birefringence crystal. The liquid crystal cell functions as a polarization controller through which the signal power is allocated dynamically between two orthogonal states of polarization. The two orthogonal states of polarization are then split spatially by the birefringence crystal. In U.S. Pat. No. 7,113,279, a polarization diversity scheme is incorporated into a liquid-crystal-based VOPS. The power splitting ratio of the VOPS is no longer dependent on the state of the polarization of the input signal, at the expense of extra polarizing beam splitter and combiner. Moreover, the performance of liquid crystal is temperature dependent therefore the VOPS will suffer from the variation of ambient temperature. Additional temperature controller or stabilizer may be used. Nevertheless, they will increase the cost accordingly. Accordingly, low cost, temperature independent, broadband VOPSs are desired.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
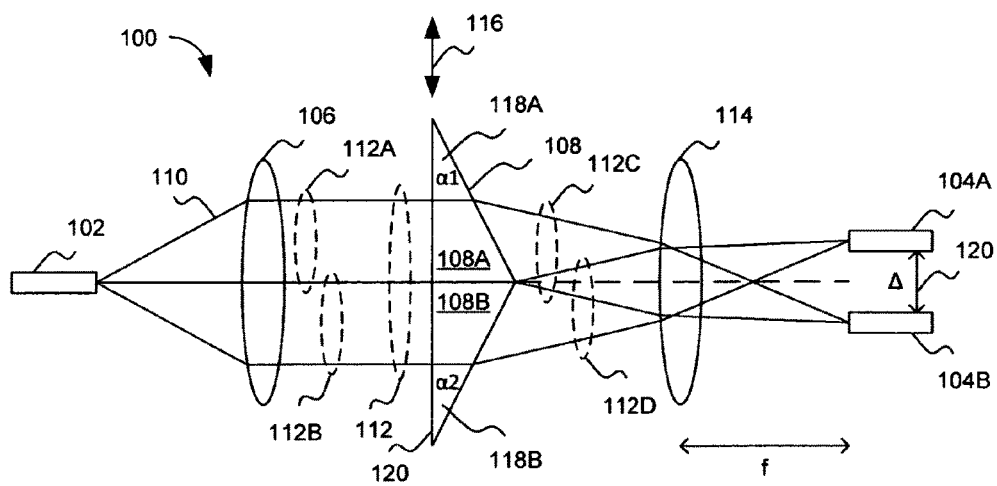
FIG. 1 shows an embodiment of 1×2 VOPS comprising a roof-prism.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations, in one or more embodiments.

A prism-based VOPS is disclosed that provides a low-cost solution for temperature independent broadband applications. FIG. 1 shows an embodiment of a VOPS 100 according to the present invention. VOPS 100 comprises an input fiber 102, output fibers 104A and 104B, a first lens 106, a second lens 114, and a roof-prism 108. A diverging light beam 110 exiting from input fiber 102 is collimated by first lens 106 to a first collimated beam 112. A portion 112A of first collimated beam 112 travels through an upper-half 108A of roof-prism 108. A portion 112B of first collimated beam 112 travels through a lower-half 108B of roof-prism 108. Portion 112A and portion 112B are split into separated collimated beams 112C and 112D, respectively, which have different directions. Separated collimated beams 112C and 112D are focused by second lens 114. The focused beams are coupled into two output fibers 104A and 104B on the focal plane of second lens 114, respectively.

Roof-prism 108 may be moved along a direction 116, which is on a plane perpendicular to first collimated beam 112, to change the power ratio of separated collimated beams 112C and 112D. Accordingly, the optical powers received by respective output fibers 104A and 104B vary, depending on the power ratio of separated collimated beams 112C and 112D.

Figure 1A:
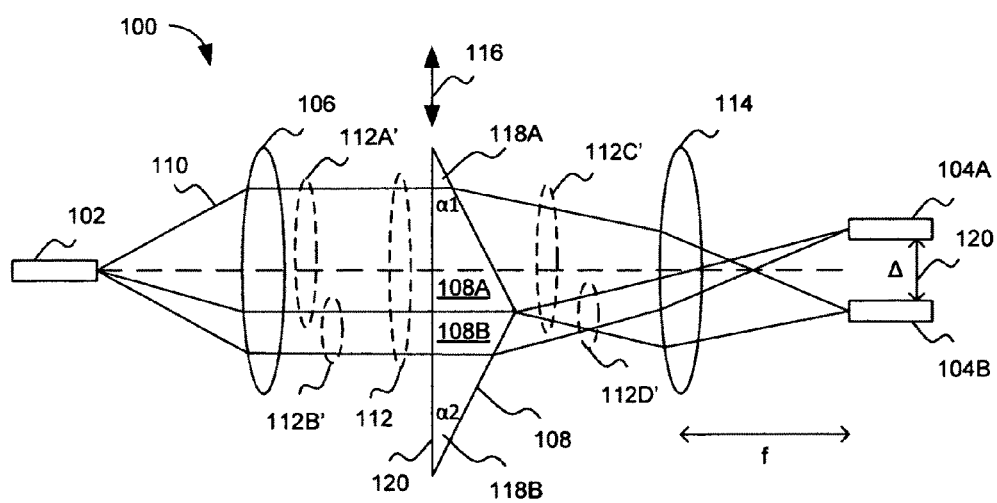
FIG. 1A shows roof-prism moved downward to change power ratio.

FIG. 1A shows that roof-prism 108 is moved downward such that the optical power contained in collimated beam 112C' is larger than the optical power contained in collimated beam 112D', according to the present invention. The optical power contained in a collimated beam is proportional to the cross-section area of the collimated beam. The optical power received by an output fiber is the optical power contained in a collimated beam that is focused and coupled into the output fiber. Accordingly, the optical power received by output fiber 104B is larger than the optical power received by output fiber 104A. In other words, the power ratio of beams 112C and 112D in FIG. 1 is less than the power ratio of beams 112C' and 112D' in FIG. 1A.

Referring to FIG. 1, base angles 118A and 118B of roof-prism 108 are $\alpha_1$ and $\alpha_2$, respectively. The relationship between base angles 118A and 118B ($\alpha_1$ and $\alpha_2$), and a separation 120 of two output fibers 104A and 104B, $\Delta$, can be described by $\alpha_1 + \alpha_2 \approx \Delta/[(n-1)f]$, where n is the refractive index of roof-prism 108 and f is the focal length of second lens 114. If roof-prism 108 has geometry of isosceles triangle, base angles 118A and 118B can be further written by $\alpha_1 = \alpha_2 \approx \Delta/[2(n-1)f]$.

Figure 2:
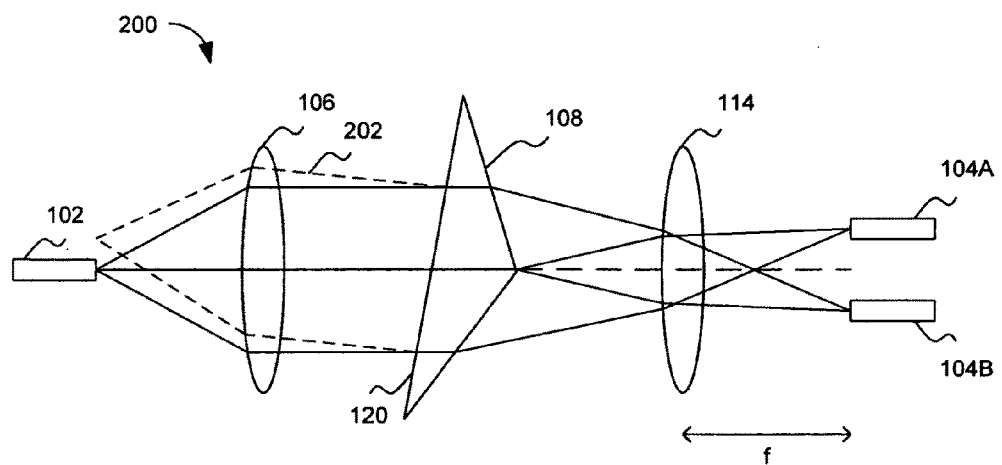
FIG. 2 shows an embodiment comprising roof-prism rotated by a few degrees.
Figure 3:
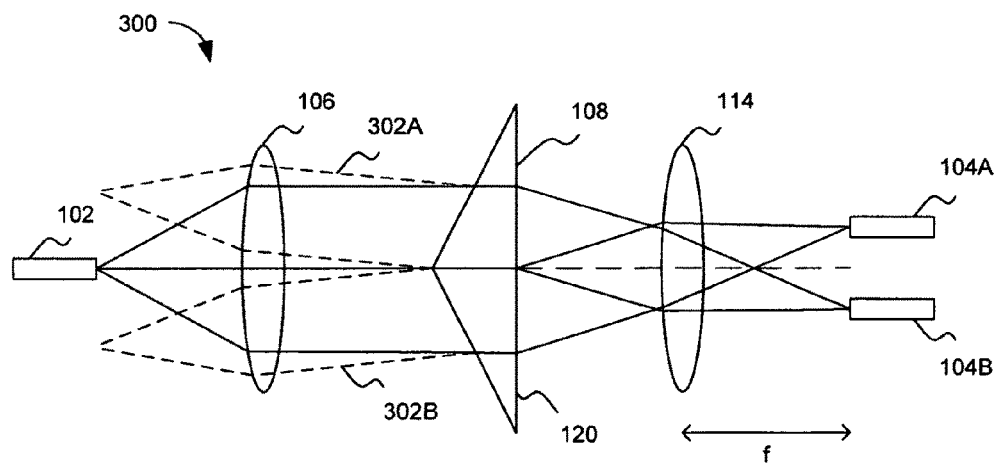
FIG. 3 shows an embodiment comprising roof-prism rotated by 180 degrees.

VOPS 100 in FIG. 1 may introduce feedback noise due to the back-reflection by a front surface 120 of roof-prism 108. Front surface 120 is the base of roof-prism 108 facing first lens 106. In order to solve the issue, two embodiments are disclosed. In an embodiment 200 shown in FIG. 2, according to the present invention, roof-prism 108 is rotated by a few degrees (e.g., less than 5 degrees) such that a reflected beam 202 from roof-prism 108 is not coupled back to input fiber 102. In an embodiment 300 shown in FIG. 3, according to the present invention, roof-prism 108 is rotated by 180 degrees so the base of roof-prism 108 is facing second lens 114. In embodiment 300 shown in FIG. 3, reflected beams 302A and 302B from roof-prism 108 are not coupled back to input fiber 102.

Input fiber 102 and output fibers 104A and 104B may be single-mode or multi-mode fibers. First lens 106 and second lens 114 may have stepped refractive index profile, e.g., C-lens, or graded refractive index profile, e.g., G-lens. Roof-prism 108 may be replaced by any collimated beam splitting device for splitting a collimated beam into a plurality of separated collimated beams having different directions. An example of collimated beam splitting device may be a volume grating. Accordingly, output fibers 104A and 104B in FIG. 1 may be replaced by a plurality of output fibers.

Figure 4:
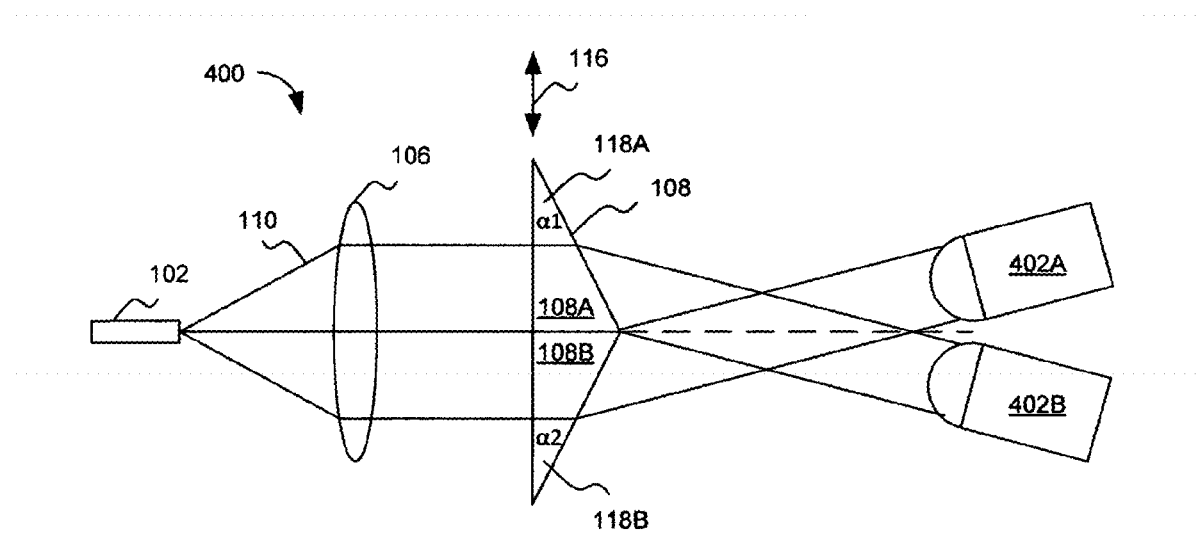
FIG. 4 shows an embodiment of 1×2 VOPS comprising two independent single-fiber collimators.

Input fiber 102 and first lens 106 may be replaced by a single-fiber collimator. First lens 106 may be replaced by any means having collimating function. Output fibers 104A and 104B and second lens 114 may be replaced by a dual-fiber collimator. Second lens 114 may be replaced by any means having focusing function. In an embodiment, a VOPS 400 comprises two independent single-fiber collimators 402A and 402B as shown in FIG. 4, according to the present invention. Single-fiber collimators 402A and 402B may replace second lens 114 and output fibers 104A and 104B shown in FIG. 1.

Figure 4A:
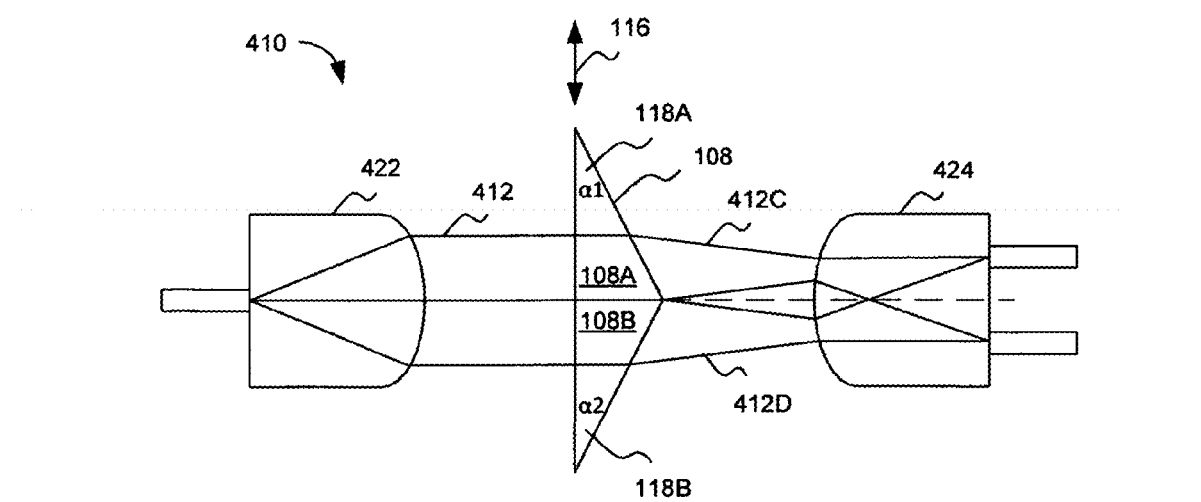
FIG. 4A shows an embodiment of 1×2 VOPS comprising input single-fiber collimator and output dual-fiber collimator.

In an embodiment, a VOPS 410 comprises an input single-fiber collimator 422 and an output dual-fiber collimator 424 as shown in FIG. 4A, according to the present invention. Input single-fiber collimator 422 replaces first lens 106 and input fiber 102 of FIG. 1, and output dual-fiber collimator 424 replaces second lens 114 and output fibers 104A and 104B of FIG. 1. A first collimating beam 412 is exiting from input single-fiber collimator 422. A roof-prism 108 splits first collimated beam 412 into two separated collimated beams 412C and 412D, which are received by output dual-fiber collimator 424.

Figure 5A:
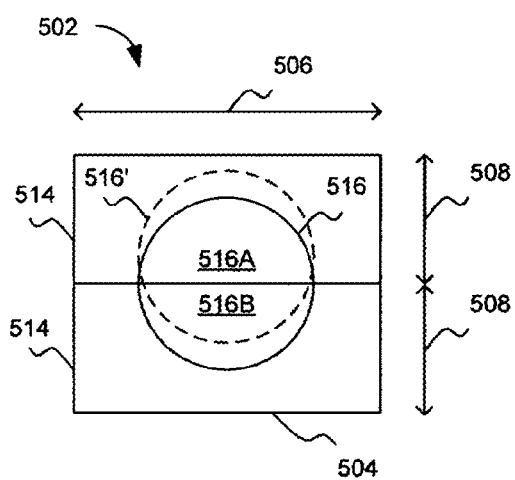
FIG. 5A shows top view of roof-prism.

FIG. 5A shows a top view of a typical roof-prism 502 used for 1×2 (one input and two outputs) VOPS, e.g., VOPS 100 of FIG. 1, according to the present invention. Roof-prism 502 has a square shape 504 in top view. Length 506 and width 508 of roof-tops 514 of roof-prism 502 are determined by the size of a collimated beam 516. For example collimated beam 516 may be first collimated beam 112 of FIG. 1. Collimated beam 516 may be inside square 504. A portion 516A of collimated beam 516 is in the upper-half of square 504, and a portion 516B of collimated beam 516 is in the lower-half of square 504. By moving roof-prism 502 up and down relative to collimated beam 516, portion 516A and portion 516B may not be equally divided. For example, collimated beam 516 is shifted to a collimated beam 516'. The area ratio of portion 516A and portion 514B determines the power ratio of two beams coupled into output fibers.

Figure 5B:
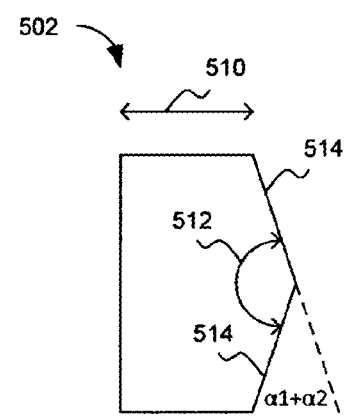
FIG. 5B shows side view of roof-prism.

FIG. 5B shows a side view of roof-prism 502, according to the present invention. Thickness 510 of roof-prism 502 may be less than the length (e.g., length 506) and the width (e.g., two times width 508) of roof-prism 502. An apex angle 512 is 180−($\alpha_1+\alpha_2$) degree, where $\alpha_1$ and $\alpha_2$ are the base angles of roof-prism 502. Since $\alpha_1$ and $\alpha_2$ are usually as small as several degrees so apex angle 512 is an obtuse angle close to 180 degree. Roof-tops 514 of roof-prism 502 may be made by polishing or molding instead of dicing so the chippings and irregularities around roof-tops are tiny and thus the scattering loss from roof-tops is rather small. Moreover, the wavelength-dependent loss from prism's dispersion can be suppressed by coated the VOPS with anti-reflection (AR) coating. The VOPS is suitable for broadband application.

Figure 6:
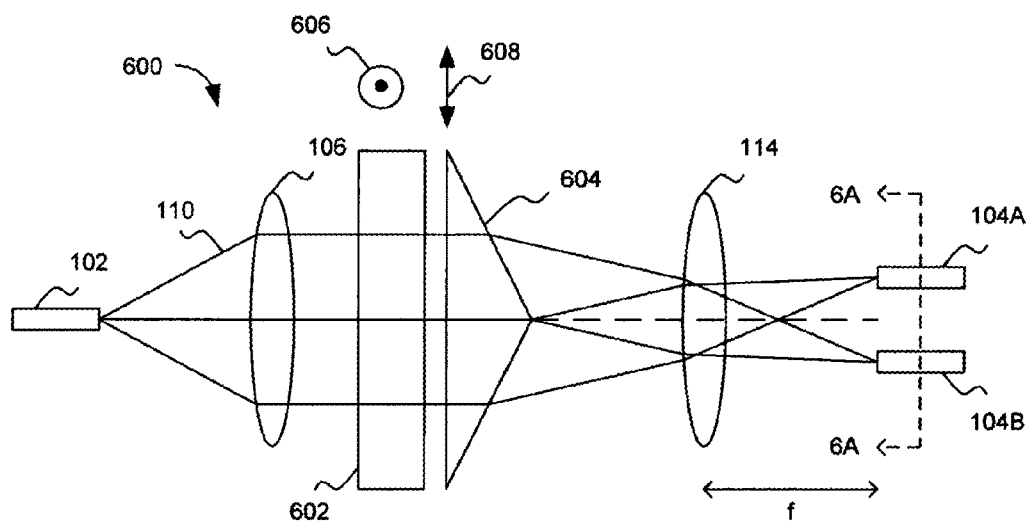
FIG. 6 shows an embodiment of 1×4 VOPS comprising two perpendicular roof-prisms.
Figure 6A:
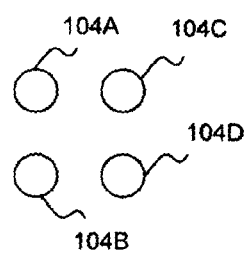
FIG. 6A illustrates cross-section intersecting output fibers of FIG. 6.

The current 1×2 VOPS can be expanded to 1×4 (one input and four outputs) VOPS by cascading two roof-prisms whose roof-tops are oriented perpendicularly to each other. FIG. 6 shows a 1×4 VOPS 600 comprises two cascaded perpendicular roof-prisms 602 and 604, according to the present invention. Third and fourth output fibers are not shown in FIG. 6. A cross-section showing all four output fibers 104A, 104B, 104C, and 104D is illustrated in FIG. 6A, according to the present invention. Cross-section shown in FIG. 6A intersects output fibers 104A and 104B in FIG. 6. In operation, the optical powers received by respective four output fibers vary by moving the two roof-prisms along perpendicular directions 606 and 608. Similar to the aforementioned 1×2 VOPS, second lens 114 and output fibers 104A, 104B, 104C, and 104D may be replaced by a quad-fiber collimator (not shown) or four independent single-fiber collimators (not shown).

Figure 7A:
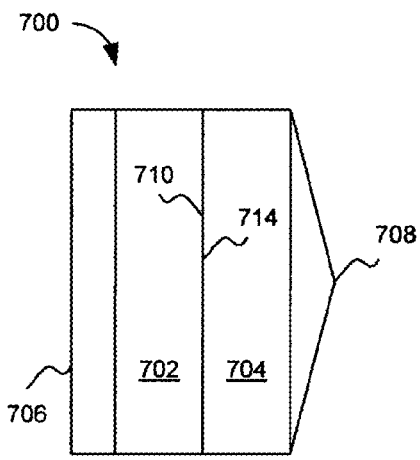
FIG. 7A shows side view of two cascaded perpendicular roof-prisms.
Figure 7B:
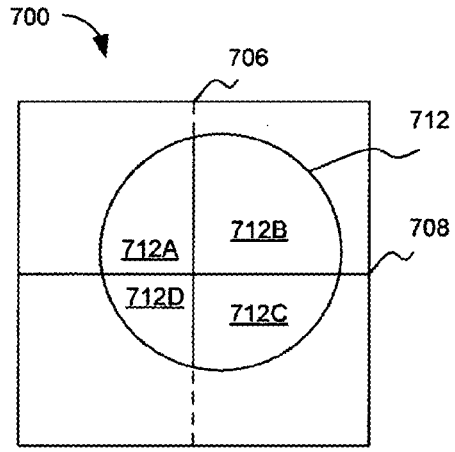
FIG. 7B shows top view of two cascaded perpendicular roof-prisms.

A structure 700 comprising two perpendicular roof-prisms 702 and 704 is illustrated in FIGS. 7A and 7B, according to the present invention. FIGS. 7A and 7B show side view and top view of structure 700, respectively. An apex line 706 of roof-prism 702 and an apex line 708 of roof-prism 704 are perpendicular to each other. A base 710 of roof-prism 702 and a base 714 of roof-prism 704 are butted together. Structure 700 intersects a collimated beam 712 perpendicularly. The optical powers received by four output fibers (not shown) are proportional to the areas 712A, 712B, 712C, and 712D of collimated beam 712, respectively.

Figure 8A:
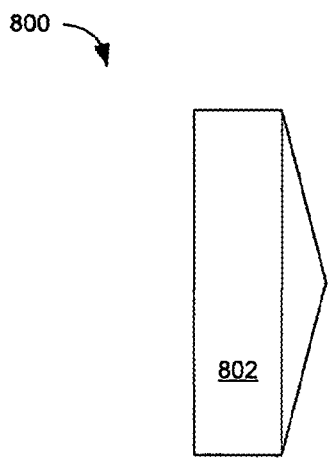
FIG. 8A shows side view of square-pyramid roof-prism.
Figure 8B:
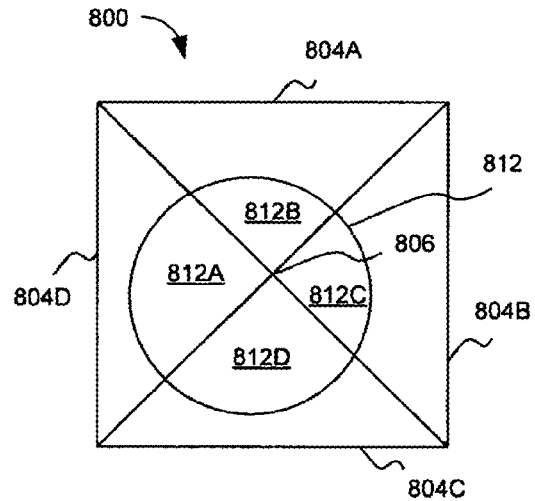
FIG. 8B shows top view of square-pyramid roof-prism.

A structure 800 comprising a square-pyramid prism 802 is illustrated in FIGS. 8A and 8B, according to the present invention. FIGS. 8A and 8B show side view and top view of square-pyramid prism 802, respectively. Square-pyramid prism 802 has four pyramid sides 804A, 804B, 804C, and 804D, and an apex 806. Structure 800 intersects a collimated beam 812 perpendicularly. The optical powers received by four output fibers (not shown) are proportional to the areas 812A, 812B, 812C, and 812D of collimated beam 812, respectively. Both structures 700 and 800 may be used for implementing 1×4 VOPS of FIG. 6. Similarly, other port-count (1×n) VOPSs can be built following the same idea and those schemes are also within the scope of current invention.

Figure 9A:
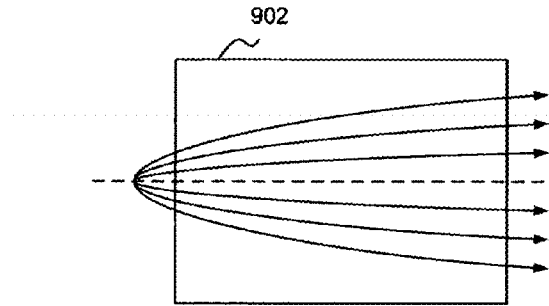
FIG. 9A shows a conventional G-lens.
Figure 9B:
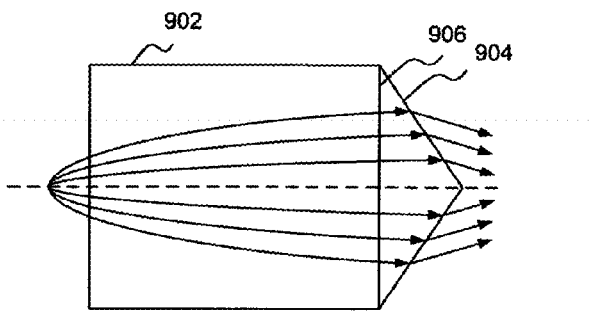
FIG. 9B shows an assembly of G-lens and roof-prism.

A broadband coupler G-lens 902 may be used in VOPS 100 illustrated in FIG. 1. FIG. 9a shows a conventional 0.23-pitch G-lens 902 for optical collimating, according to the present invention. A roof-prism 904 may be glued and assembled with G-lens 902 at a flat surface 906 as shown in FIG. 9b, according to the present invention. Therefore the size of an input coupler comprising input fiber 102, G-lens 902, and roof-prism 906 can be reduced greatly. The splitting power ratio can be changed by properly shifting input coupler comprising input fiber 102, G-lens 902, and roof-prism 906 against an output coupler comprising output fibers 104A and 104B and lens 114 as illustrated in FIG. 1.

Figure 10A:
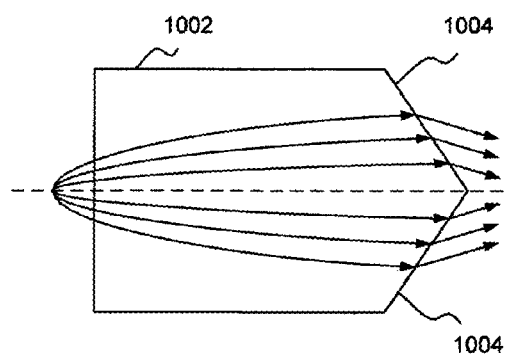
FIG. 10A shows a G-lens having bevels.
Figure 10B:
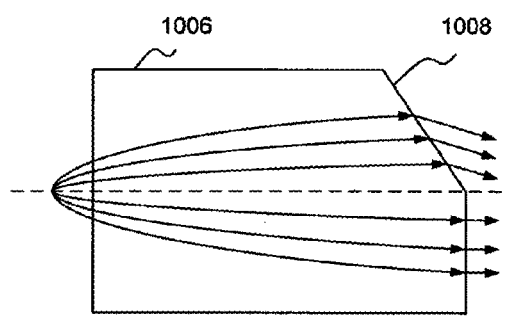
FIG. 10B shows a G-lens having chamfer.

Going a step forward, a G-lens 1002 may be polished to have bevels 1004 at an end surface as shown in FIG. 10A, according to the present invention. A G-lens 1006 may be polished to have a chamfer 1008 at an end surface as shown in FIG. 10B, according to the present invention. Accordingly, an extra roof-prism is no longer necessary and thus the cost of the coupler can be saved further.

It is appreciated that the prism, prism structure, or any collimated beam splitting devices in an embodiment can be moved in either a manual or an electrical manner. Therefore, a manual and an electrical VOPS can be built accordingly.

Figure 11:
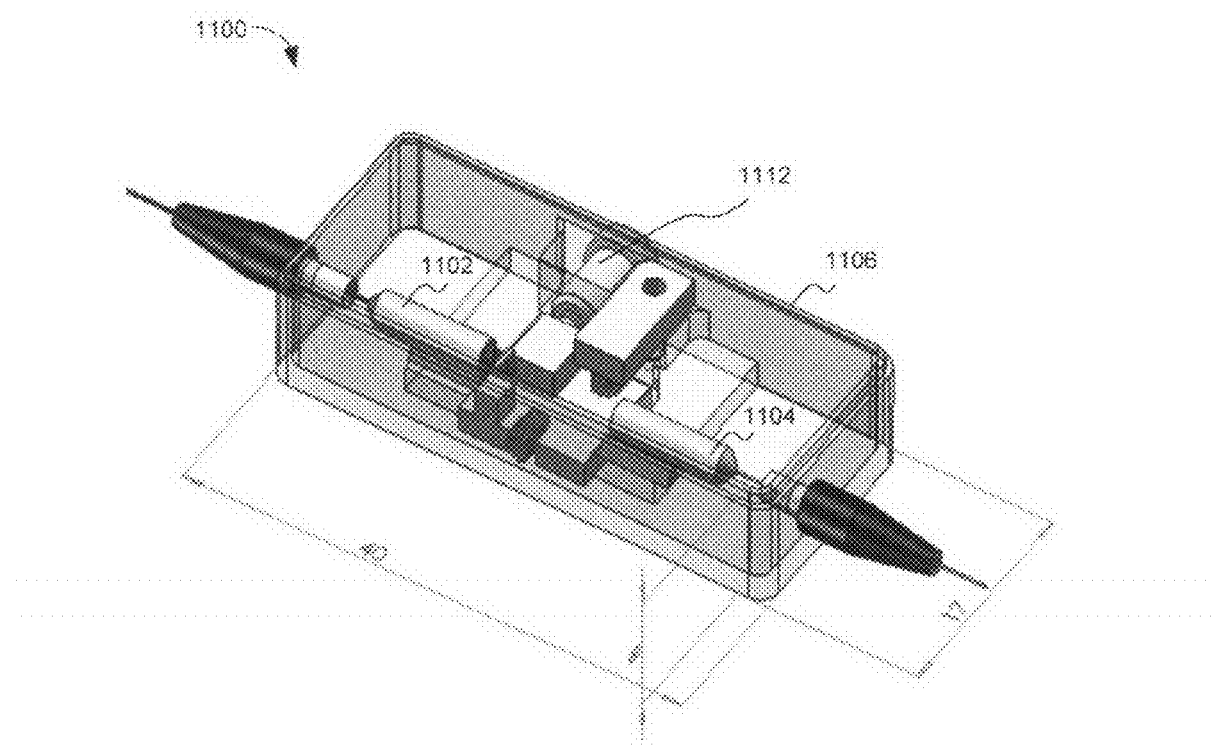
FIG. 11 illustrates an example 1×2 manual VOPS in perspective view.
Figure 12:
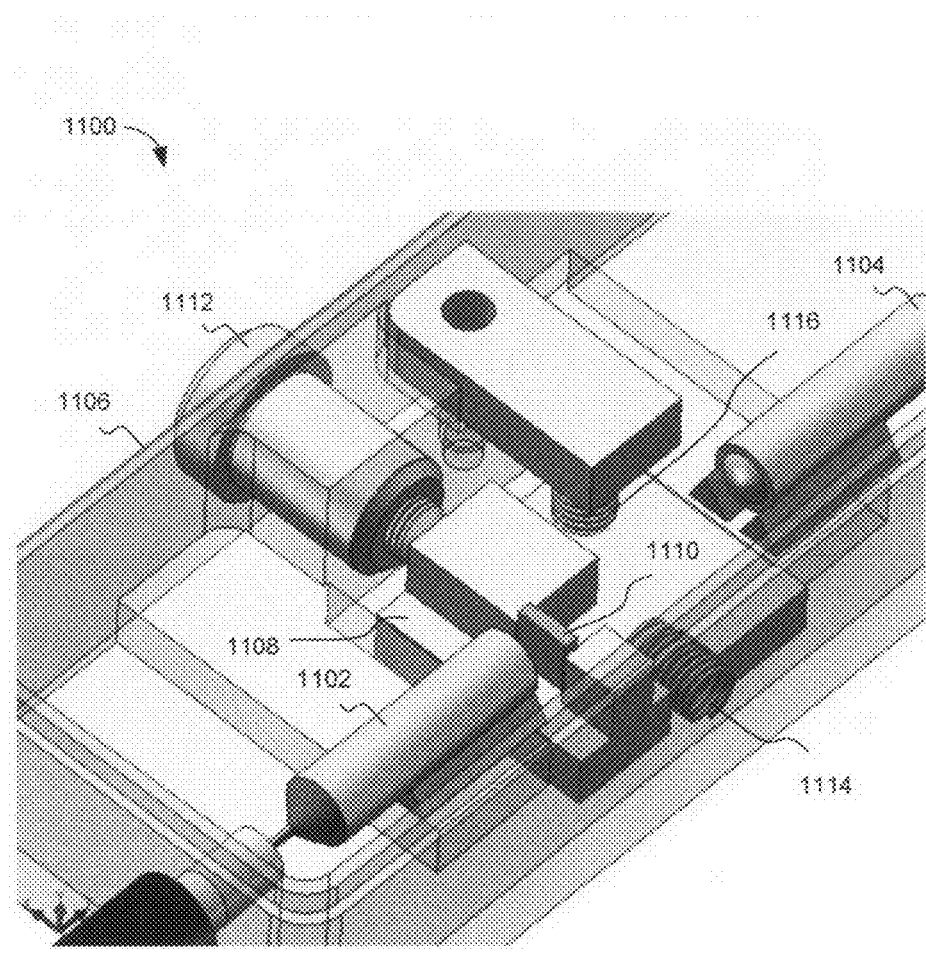
FIG. 12 shows an enlarged view of FIG. 11.

An example 1×2 manual VOPS 1100 is illustrated in perspective view in FIGS. 11 and 12, according to the present invention. FIG. 12 shows an enlarge view of FIG. 11. An input single-fiber collimator 1102 and an output dual-fiber collimator 1104 are disposed at opposite sides of a device enclosure 1106. A one-dimension sliding stage 1108 carries a roof-prism 1110 that can be moved on a plane perpendicular to a collimated beam exiting from input single-fiber collimator 1102. Roof-prism 1110 splits the first collimated beam into two separated collimated beams, which are received by output dual-fiber collimator 1104. A mechanical screw 1112 is used to push one end of sliding stage 1108 so that roof-prism 1110 moves once screw 1112 pushes sliding stage 1108. Sliding stage 1108 has a first spring 1114 that connects it to device enclosure 1106. First spring 1114 is used to ensure that when screw 1112 moves in a retrieving fashion, the prism does move in the same retrieving direction. A second spring 1116 is in the direction perpendicular to the direction of first spring 1114, which is used to stabilize roof-prism 1110 carrying stage 1108 so that any minor torque related twisting forces will not cause roof-prism 1110 to have any motion other than the one in the intended direction. In other words, any minor torque related twisting forces will not cause roof-prism 1110 to deviate from the pushing direction of mechanical screw 1112.

Embodiments of VOPS may include a variety of springs (e.g., pulling vs. pushing), stages, numbers of springs, and spring mounting locations. The VOPS may include a motor or a plurality of motors, and other actuator driven schemes that are not manual but electrically controlled. If instead of one-dimension motion actuator, a two-dimension motion actuator is used within the VOPS, structures 700 and 800 shown in FIG. 7 and FIG. 8 can be used to control optical power divisions among four output fibers.

Accordingly, a method for splitting and controlling optical powers provided by an input fiber and received by a plurality of output fibers comprises: (a) providing a first collimated beam from the input fiber using a first lens; (b) splitting the first collimated beam into a plurality of separated collimated beams having different directions using a collimated beam splitting device; (c) controlling area of each separated collimated beam by moving the collimated beam splitting device on a plane perpendicular to the first collimated beam; and (d) focusing the plurality of separated collimated beams using a second lens and coupling the focused beams into the plurality of output fibers, respectively.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof. For the disclosed methods, the steps need not necessarily be performed sequentially.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An apparatus comprising:
   an input fiber;
   a first lens for collimating a diverging light beam exiting from the input fiber to a first collimated beam;
   a collimated beam splitting device for splitting the first collimated beam into four separated collimated beams having four different directions;
   four output fibers;
   a second lens for focusing the four separated collimated beams having four different directions, and coupling the focused beams into the four output fibers, respectively; and
   a two-dimensional actuator for moving the collimated beam splitting device on a plane perpendicular to the first collimated beam for controlling optical powers received by the plurality of output fibers, respectively;
   wherein the collimated beam splitting device comprises a first roof-prism cascaded with a second roof-prism, an apex line of the first roof-prism and an apex line of the second roof-prism are perpendicular to each other, a base of the first roof-prism and a base of the second roof-prism are butted together, the bases of the first and second roof-prisms intersect the first collimated beam perpendicularly.

2. The apparatus of claim 1, wherein the first lens is a G-lens.

3. The apparatus of claim 1 further comprising:
   a stage for carrying the collimated beam splitting device;
   a plurality of springs for stabilizing the stage when the collimated beam splitting device is moved by the actuator.

* * * * *